United States Patent [19]

Johansson et al.

[11] Patent Number: 4,631,360

[45] Date of Patent: Dec. 23, 1986

[54] APPARATUS FOR THE CURRENT SUPPLY OF A SUBSCRIBER SET FROM AN EXCHANGE

[75] Inventors: Jan H. Johansson, Bålsta; Nils J. Sundvall, Lidingö, both of Sweden

[73] Assignee: Telefonaktiebolaget LM Ericsson, Stockholm, Sweden

[21] Appl. No.: 606,820

[22] PCT Filed: Sep. 14, 1983

[86] PCT No.: PCT/SE83/00329

§ 371 Date: Apr. 27, 1984

§ 102(e) Date: Apr. 27, 1984

[87] PCT Pub. No.: WO84/01249

PCT Pub. Date: Mar. 29, 1984

[30] Foreign Application Priority Data

Sep. 17, 1982 [SE] Sweden .................... 8205342

[51] Int. Cl.$^4$ ........................................ H04M 19/00
[52] U.S. Cl. ........................................ 379/324; 379/413
[58] Field of Search ............. 179/170 NC, 170 R, 70, 179/77, 16 F, 16 AA

[56] References Cited

U.S. PATENT DOCUMENTS

| 4,306,122 | 12/1981 | Nijman et al. | 179/170 NC |
| 4,315,106 | 2/1982 | Chea, Jr. | 179/16 F |
| 4,419,542 | 12/1983 | Embree et al. | 179/77 |
| 4,588,860 | 5/1986 | Ayano et al. | 179/77 |

OTHER PUBLICATIONS

"Integrated Circuits for Telephony", Gray et al., Proceedings of the IEEE, vol. 68, No. 8, Aug. 1980, pp. 991-1009.

Primary Examiner—Thomas W. Brown
Assistant Examiner—R. Vaas
Attorney, Agent, or Firm—Roberts, Spiecens & Cohen

[57] ABSTRACT

An apparatus for applying current to a subscriber line telephone set (RL) with associated two-wire line connected to a telephone exchange. The apparatus includes two analog amplifiers (5,6) each with its output connected to one of the two wires of the line, and feeding out on the line the combined DC current and current representing the speech signal. A DC/DC converter supplies voltage to an at least one of the amplifiers. To form a control voltage to the DC/DC converter, a cascade connection of a differential amplifier (1), a low-pass filter (2) and an adding circuit (3) are arranged between the line connection terminals and the control signal input of the DC/DC converter.

6 Claims, 1 Drawing Figure

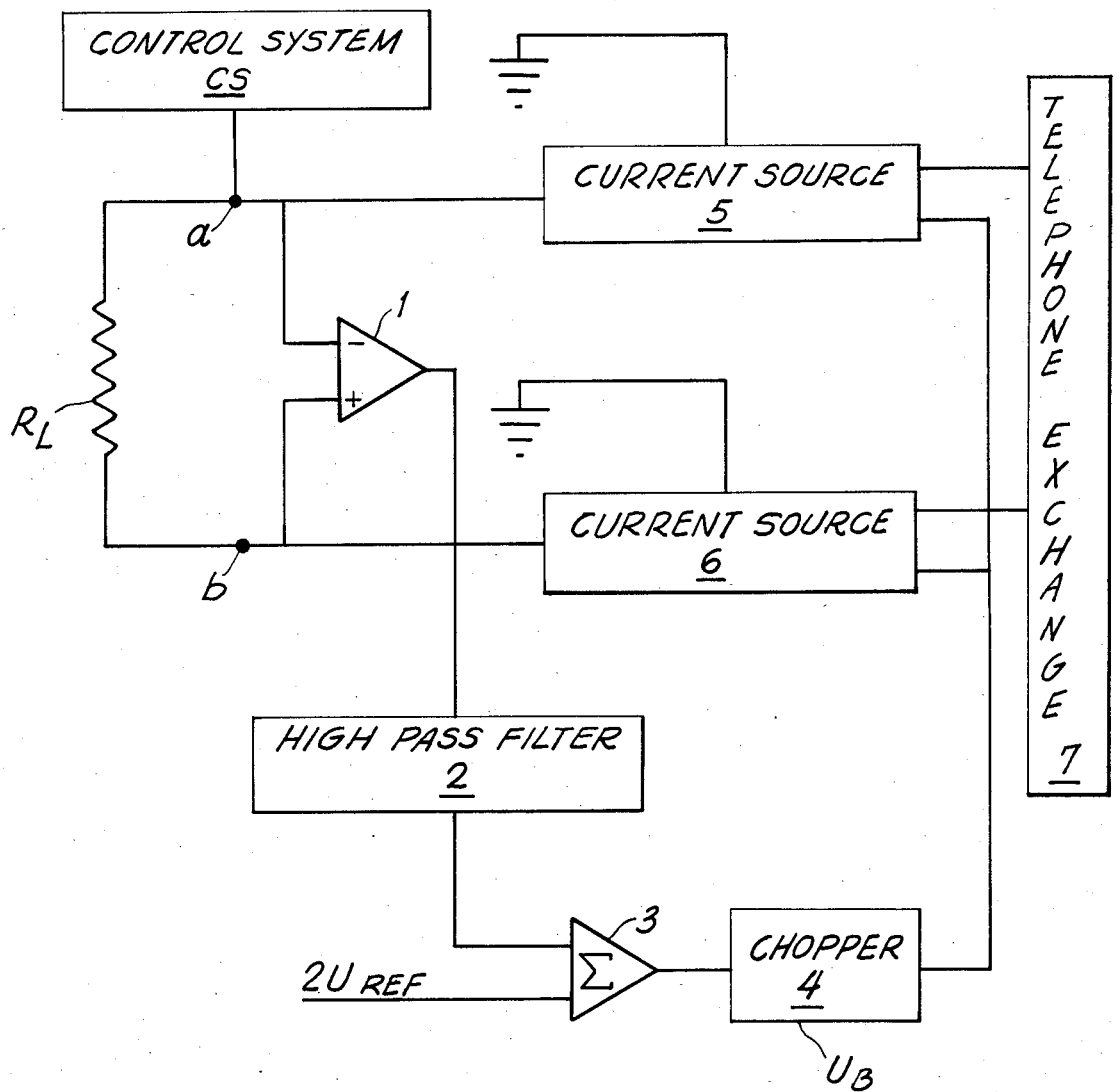

APPARATUS FOR THE CURRENT SUPPLY OF A SUBSCRIBER SET FROM AN EXCHANGE

TECHNICAL FIELD

The present invention relates to an apparatus for the current supply of a subscriber's telephone set from a telephone exchange.

BACKGROUND ART

In telephone installations the subscriber sets are connected to the exchange by so-called subscriber lines, which are terminated in the exchange at an adaption circuit, or subscriber line interface circuit (SLIC). Such a circuit is used, inter alia, to supply DC current to the associated subscriber apparatus.

A fixed DC voltage may be utilized for this current supply in the prior art. In such a case, the current flowing through the subscriber line will be a function of the internal resistance of the subscriber apparatus or station, and of course the line length. The internal resistance in the apparatus can be kept within narrow limits, but the line length and line resistance may vary considerably. If there is a fixed DC voltage, this must be set to a value such that sufficient DC current can be fed out on long lines also. Thus a larger current than necessary flows through short lines, and it is necessary to reckon with larger losses than necessary in both line and adaption circuit, above all in the supply resistances in this circuit.

The heat due to losses puts a limit on the packing desity of the circuits in the exchange, and it is therefore a primary object to reduce the generation of heat.

It is similarly already known to simulate the physical supply resistances with the aid of feed-back amplifiers, thereby using low-ohmic resistance for measuring and protective purposes. In this way power generation in the supply resistances can be reduced, but the corresponding power is instead generated in the output stage of the amplifiers. Power generation in the output stage is greatest for short lines, and is determined by the outgoing line current multiplied by the DC voltage excess occurring across the amplifier stage.

In order to reduce the power generation in the amplifiers in the next stage it is known, in principle, to take up the excess voltage at no power in the DC/DC converter, the total power generation in the line circuit thus being considerably reduced.

Two principles are described in the litterature for the impedance simulation, c.f. PROCEEDINGS OF THE IEEE, vol. 68, NO 8, AUGUST 1980, pages 991–1009, for example. According to one principle, the line current is sensed to form an instantaneous value in a control system controlling the line voltage. This method gives simple conditions for the operating point setting of the participating amplifiers and control of DC/DC converters. However, the method has the considerable disadvantage that the amplifier which has to sense the line current out on the line will be difficult to achieve with sufficient precision.

According to the other method, the line voltage is sensed and the control system controls the line current. This method gives more simple conditions for realizing the sensing amplifier, but on the other hand it gives difficulties in setting the operating points of the amplifier and control of DC/DC converters.

The most obvious way of realizing a line circuit, per se developing low power in accordance with the above-mentioned principles, is to arrange a DC/DC converter, e.g. in the form of a so-called chopper in the current supply path to each speech wire. The necessary AC symmetry (grounding balance) in the speech frequency band is thus retained right down to DC. However, from the aspect of saving in components, there is preferred an arrangement with only one chopper, thereby accepting the lack of symmetry occurring at least for DC and low frequencies. The symmetry demands for the speech band are met, however. When such a solution with only one chopper is used, the difficulties mentioned above with the operating point setting and control of the chopper are greater than when using the other impedance simulation method according to the above.

DISCLOSURE OF INVENTION

What is also applicable to the apparatus is that the potential of one of the subscriber line's both terminals, e.g. that of the a terminal, is kept at a fixed mean value simultaneously as the potential of the other terminal, i.e. the b terminal, is given a mean value dependent on the load, in this case functionally in response to the mean current taken out between the terminals. After possible pole reversion of the current supply the conditions apply in reverse for the two poles.

The technical problem solved by the present invention resides in that in a system based on the above principle, with voltage sensing and current regulation to provide a control voltage to the chopper, such that its output voltage in the conditions given above is at a given amount above the voltage on the b-terminal in a non-pole-reversed condition. After pole-reversion the chopper output voltage shall be related in the same manner to the potential of the a-terminal.

The solution of this problem is characterized as will be seen from the appended claims. The solution principle is also applicable to systems with two choppers per subscriber line.

One advantage with the invention is that it enables an impedance realization according to the other method above in combination with voltage supply from a chopper.

DESCRIPTION OF FIGURE

The invention will now be described in more detail with reference to the appended drawing, on which the sole FIGURE illustrates an embodiment of the invention.

BEST MODE FOR CARRYING OUT THE INVENTION

The inventive principle will be illustrated below for an application to a subscriber line circuit with one chopper, but as mentioned above, the principle can also be utilized in systems with two choppers per line.

The sole FIGURE illustrates an embodiment of the invention. A condition for the continued discussion is that the point a in the FIGURE, i.e. the subscriber line a terminal, is given a fixed mean potential, e.g. $U_{REF}$, as mentioned above, with the aid of a control system CS. This system can be implemented as will be seen from the Swedish patent application No. SE 8204185-6 corresponding to U.S. patent application Ser. No. 06/598,322 filed Mar. 6, 1984, for example, or any other such system.

Via its a and b terminals, the subscriber line circuit supplies a load, e.g. in the form of a telephone set with line, symbolized here by a resistor with resistance RL. Each terminal is connected to the output of an analogue amplifier 5,6, which is coupled as a current source. Via its final stage, each of these amplifiers can drive positive or negative current out on the line to the load from an earth-connected voltage terminal on the amplifier and a voltage terminal connected to the output from a DC/DC converter implemented as a chopper.

There is defined a non-pole-reversed condition in the circuit as being when the DC-current to the telephone set goes from the earth-connected voltage terminal of the amplifier 5 via the final stage of the amplifier to the line circuit terminal a and through the load to the line circuit terminal b through the final stage of the amplifier 6 and to the output of the chopper 4. In a corresponding pole-reversed condition the current goes instead from the earth-connected voltage terminal on the amplifier 6 through its final stage and the load and further through the final stage of the amplifier 5 to the output on the chopper.

The block 7 represents the rest of the subscriber line circuit, the detailed implementation of which lacks interest for the description of the present invention. In this connection it is sufficient to consider the block as a current source, the polarity of which may be reversed. On the input of each amplifier 5, 6 there is thus a down-scaled version of the actual line current.

The voltage between terminal a and terminal b on the output from the line circuit towards the line and the load is sensed with the aid of a differential amplifier 1. Transversal signal components, e.g. from speech signals on the line, are filtered off from the output voltage from the amplifier 1 with the aid of a lowpass filter 2. A reference voltage $2U_{REF}$ is added thereafter to the filtered voltage in an adding circuit 3, the output voltage of which is allowed to constitute the control voltage to a DC/DC converter. In this case the converter has the characteristics of a voltage amplifier with a gain of +1 and is implemented as a chopper.

It will be understood that the lowpass filter 2 may also be located at other places than the one shown in the chain between the terminal and the chopper. For example, the filter may be placed on the input side of the amplifier 1 or alternatively on the input to the chopper. The chopper is supplied with voltage from a battery on its input terminal $U_B$.

In accordance with the above, the potential of the a terminal is kept at a fixed mean value, e.g. $U_{REF}$, by a control system not illustrated here. There is thus provided a signal range on the output of the amplifier 5, such that the speech signals on the line do not saturate the amplifier. If it is assumed that the terminal a has the voltage −5 V relative ground, an example of a steady state in the circuit may be as follows: The terminal b has the voltage −30 V. The gain in the differential amplifier 1 is set to +1, its output voltage thus being −25 V. The reference voltage $2U_{REF}$, i.e. the one input voltage to the adding circuit 3, has the value −10 V and thus the output voltage from the circuit 3 will be −35 V. The chopper output voltage will thus also be −35 V and the signal range for the amplifier 6 will be equal to 5 V, i.e. $U_{REF}$.

After pole reversal, with retained reference voltage to the adding circuit and reversed sign for the amplification in the amplifier 1, the same output voltage from the chopper and the same siganl space on the output of the amplifiers 5, 6 will be obtained.

What is claimed is:

1. In a telephone exchange system apparatus for supplying current to a subscriber telephone set connected via a two-wire line to first and second terminals of the telephone exchange, said apparatus comprising first and second current source amplifiers each having an output connected to one of the terminals and each having input means, a DC/DC converter means having a control input and an output means connected to the input means of at least one of said current source amplifiers, means for maintaining the first terminal at a fixed potential, a series circuit means having an input connected across the first and second terminals and an output connected to the control input of said DC/DC converter means, said series circuit means generating a control signal to control said DC/DC converter means to emit a signal from the output means of said DC/DC converter means having a voltage which is a given level above the potential of the second terminal.

2. The apparatus of claim 1 wherein said series circuit means comprises a differential amplifier having inputs connected to the terminals and an output and a series circuit of a lowpass filtering means and a two input summing amplifier means connected between the output of said differential amplifier and the control input of said DC/DC converter means, one of the inputs of said summing amplifier means receiving a signal related to a signal from said differential amplifier means and the other input receiving a reference voltage.

3. Apparatus for the supply of current to a subscriber telephone set ($R_L$) connected to a telephone exchange which emits current-representing speech signals via a two-wire line departing from an a and a b output terminal of the apparatus including two analogue amplifiers (5,6) coupled as current sources, one of the analogue amplifiers having an output connected to output terminal a, the other of the analogue amplifiers having an output connected to output terminal b, through which the combined DC current and current representing the speech signal are fed to the line, a DC/DC converter (4) with a control signal input, a fixed voltage input and an output which is connected to a voltage feed input on at least one of the amplifiers (5,6), the amplifier output connected to the a output terminal being arranged with the aid of a control system to be kept at a fixed potential, characterized in that a cascade circuit means, including a differential amplifier (1), a lowpass filter (2) and an adding curcuit (3) with a reference signal input ($2U_{REF}$) is connected between the a and b output terminals and the control signal input of the DC/DC converter (4), said cascade circuit means sensing the voltage across the output terminals a and b, adding thereto said reference voltage ($2U_{REF}$) and forming a lowpass-filtered control voltage, said cascade circuit means sending the lowpass-filtered control voltage to said control signal input of the DC/DC converter (4) such that the output voltage of the DC/DC converter is at a given level above the potential at the b output terminal.

4. Apparatus as claimed in claim 3 characterized in that the differential amplifier has a first input directly connected to one of said output terminals (a) and a second input directly connected to the other of said output terminals (b) such that lowpass-filtering is carried out after said sensing of the voltage across said output terminals (a and b).

5. Apparatus as claimed in claim 4 characterized in that the lowpass-filter (2) has an input directly connected to the output of the differential amplifier (1).

6. Apparatus as claimed in claim 4 characterized in that the lowpass-filter (2) has an output connected to the control signal input of the DC/DC converter (4).

* * * * *